Aug. 12, 1952

A. SPENCER ET AL
SERVOMOTOR CONTROL FOR ROTARY PUMP
AND MOTOR HYDRAULIC TRANSMISSIONS 2,606,423

Filed March 16, 1948

INVENTORS
ARTHUR SPENCER
JOHN HEWITT
By:
Haseltine, Lake & Co.
AGENTS

Aug. 12, 1952         A. SPENCER ET AL         2,606,423
       SERVOMOTOR CONTROL FOR ROTARY PUMP
           AND MOTOR HYDRAULIC TRANSMISSIONS
Filed March 16, 1948                         2 SHEETS—SHEET 2
FIG.2.
FIG.3.
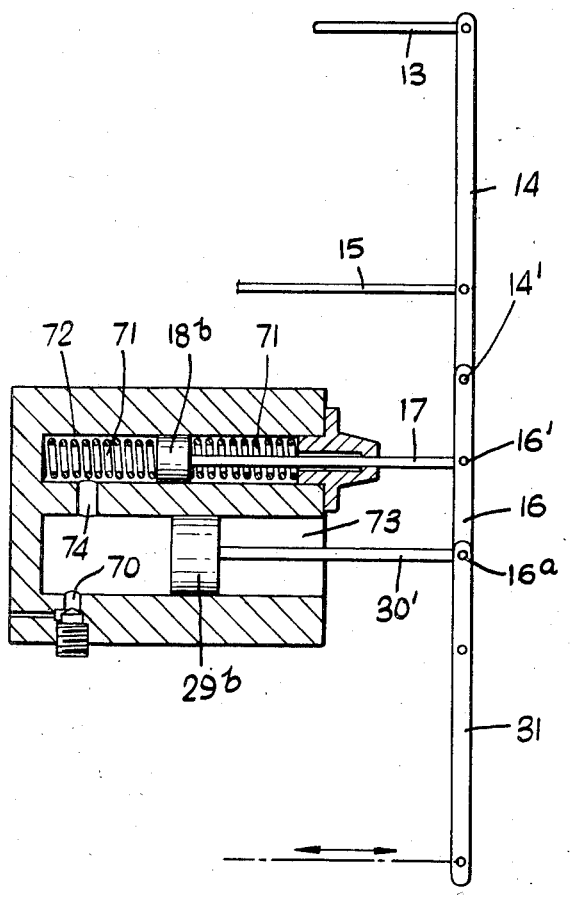
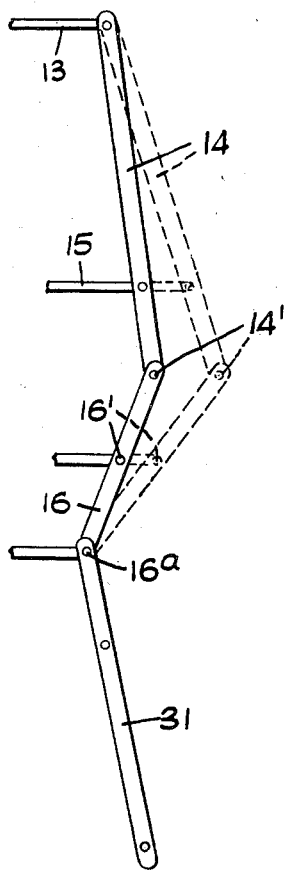
Inventors
ARTHUR SPENCER and
JOHN HEWITT
By Haseltine Lake & Co
AGENTS Patented Aug. 12, 1952

2,606,423

UNITED STATES PATENT OFFICE 2,606,423

SERVOMOTOR CONTROL FOR ROTARY PUMP AND MOTOR HYDRAULIC TRANSMISSIONS

Arthur Spencer and John Hewitt, Westminster, London, England, assignors to Vickers-Armstrongs Limited, London, England, a British company Application March 16, 1948, Serial No. 15,196
In Great Britain March 19, 1947

6 Claims. (Cl. 60—53)

This invention relates to a hydraulic appliance for controlling hydrodynamic machines of the types employed to translate rotary mechanical motion into a flow of fluid or vice versa, and more particularly for varying the displacement of a hydrodynamic machine in response to a variation in pressure of the motive fluid, the machine either being a motor or a pump. An object of the invention is to provide highly sensitive means for maintaining the power output of the machine substantially constant. Another object of the invention is to provide means for use with hydraulic apparatus embodying a pump supplying liquid at a uniform rate to a hydraulic motor and in which the said means operates as a pressure responsive control for varying the displacement of the motor directly in proportion to variations in pressure to ensure that the motor will drive its load at speeds which vary inversely to variations in the magnitude of the load. That is to say so as to obtain a substantially uniform power output of the motor.

One example of an apt application of the invention is given in our application Serial No. 12,848 in which there is provided strip material winding or coiling apparatus, e. g., for use with wire or strip metal rolling machinery and which has a highly sensitive response to changes in linear speed and/or tension of the strip or like material to effect the necessary adjustments in the speed and torque output of the hydraulic motor so as to maintain the constant predetermined tension in the material which incidentally results in constant horse power output from the hydraulic motor and which can in one case drive the means feeding the material from the supply end to the take-up end, or alternatively adjust the relative speeds of both ends.

Another example of an apt application of the invention is to a pump serving, e. g., a plurality of apparatus by lines requiring a uniform pressure therein, but in which the number of apparatus in use at a time is subject to variations, thus requiring a change in quantity output by the pump.

According to the present invention a hydraulic appliance for the aforesaid purpose comprises means adapted to maintain automatically a predetermined effective power outlet of the appropriate pump or motor or the pressure in the delivery side of the pump in correspondence with plus or minus changes in the reaction of the load being driven by the motor or in the apparatus being fed by the pump, said automatic means being adapted to respond to changes in the load on the pump or motor or in the nature or number of apparatus being served by the pump in such manner that it controls in one case the motor and in the other case the pump, to obtain the desired torque or quantity output respectively appropriate to said changes in load or apparatus.

By way of example, the invention can be regarded as suitable for use with a system having a load driving engine with a constant horse power output, but which is subject to variations in speed such as, e. g. in the strip winding or coiling machinery aforesaid, and consequently it is necessary to obtain automatically the adjustment in speed to give the correct torque to maintain a constant horse power. That is to say the means of the present invention is, when applied to an example of means as aforesaid, adapted to adjust automatically the ratio of R. P. M. to torque so as to obtain a constant product, i. e., horse power, and when the invention is applied say to a hydraulic engine of the tilting swash plate type, the means of the present invention measures the pull on the strip material, i. e., the load, and automatically alters the tilt of the swash plate so that the speed of the output shaft of the hydraulic engine is altered to maintain the aforesaid product, i. e., constant horse power. However, the control means according to the present invention is adapted for use with other types of machinery in which the same desideratum has to be achieved, that is a constant horse power output while there exists a tendency for variations to arise in the tension on the driven load and R. P. M. pressure and capacity, or tension and velocity.

Having regard to the foregoing the hydraulic appliance of the present invention in its preferred form is arranged as a unit ready for adaptation to machinery in which the foregoing correction has to be made automatically, the appliance embodying what is in effect an automatic regulating mechanism having a hydraulically operated servo-device by which a motion controlling output means can be driven in, e. g. advancing and retarding directions, swash plate tilt changing directions, rheostat adjusting directions, shunt circuit selecting directions, etc., appropriate to the control of a load driving engine, the servo-device being associated with means, e. g. a fractional horse power motor and pump, or a pump driven off an available source of energy, for generating a substantially constant hydraulic pressure, the servo-device embodying a valve controlling the admission of the pressure fluid to the said motion controlling output means, said valve being connected for operation to regulatable means adapted to be pre-set to balance against a predetermined load to be met by the engine, said latter means being adapted to respond to plus or minus variations in said predetermined load and in the resistance or yield of the engine speed adjusting means to said motion controlling output means in such manner as to upset the said balance to an amount proportional to the changes in such load in order to adjust the position of the valve for obtaining the desired displacement of the said controlling output means.

In order that the invention may be clearly understood and readily carried into effect drawings are appended hereto illustrating somewhat diagrammatically an embodiment thereof, and wherein:

Figures 2 and 3 show a modification of an error-derivative part of the appliance.

Figure 1:
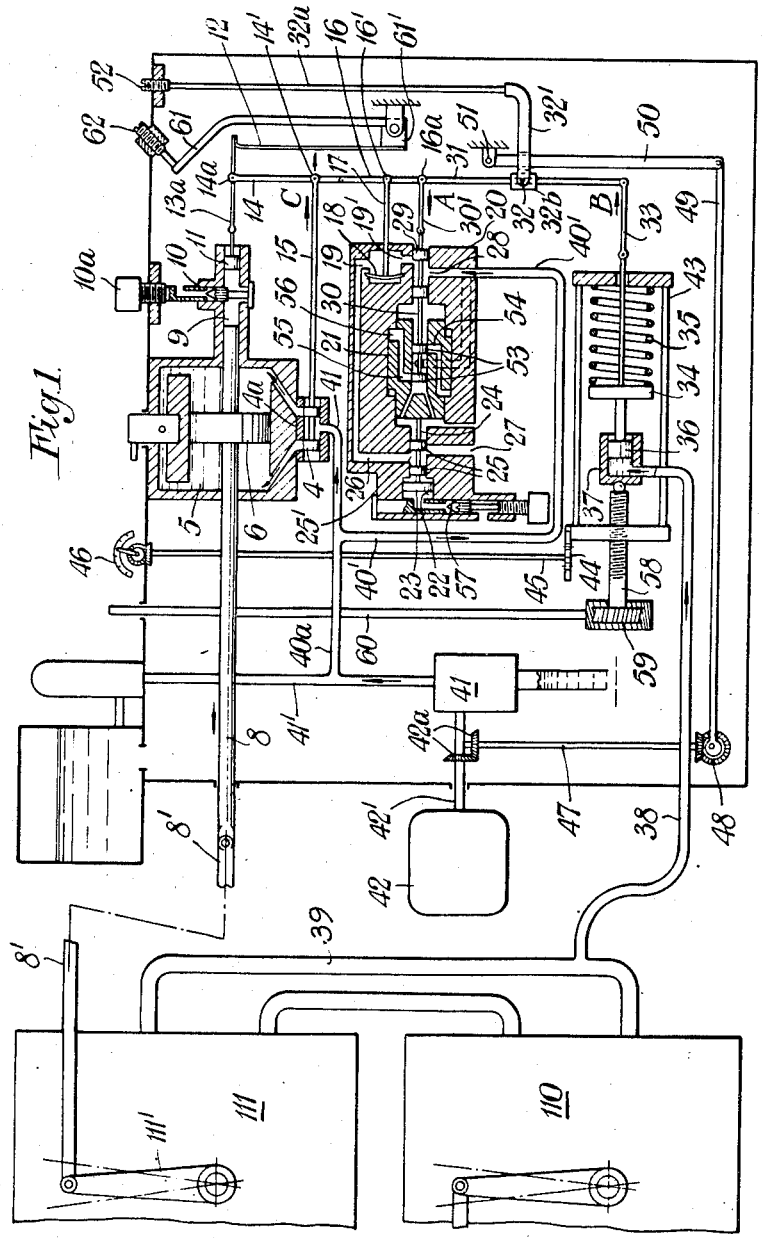
Figure 1 shows in section a complete control unit.

Referring to the drawings, for the purpose of understanding the operation of the appliance let it be assumed that the tilting lever 111' of a tilting swash plate type of hydraulic motor 111 has to be adjusted so as to vary the stroke of the motor to take care of say the build-up of strip material being wound on to a drum in a machine for rolling or otherwise treating continuous flexible material which has to be maintained at a constant tension and speed, the motor being fed from a pump 110 driven from a constant speed electric motor not shown. As the material builds up on the drum clearly the R. P. M. of the drum must be progressively decreased to keep the rate of feed of the material constant, and likewise the torque on the output shaft of the motor must be correspondingly progressively increased. Hence, the tilt of the lever 111' must be adjusted in response to the aforesaid variations to increase or decrease the stroke of the motor, and this is effected by a servo-device incorporating the aforesaid regulating mechanism.

The said regulating mechanism will be described in detail hereinafter, but briefly its chief embodiments are (a) a variable rate spring 35 the initial loading of which can be set as desired by a tension adjustment shaft 60 to obtain the aforesaid balance against a predetermined load to be met by the hydraulic motor aforesaid, the loading of this spring being thereafter upset by (b) i. e. means responding to the changes in said load, e. g. by feeding off from the machinery driven by the motor hydraulic pressure which changes with the tension in the material; (c) a series of levers 14, 16 and 31 connected across the said variable rate spring and the means which applies the tilt to the lever 111' i. e. a tilt control piston 6 and its associated control valve 4, the fluid pressure operated means (b) aforesaid comprising the cylinder 37 with piston 36 adapted to be displaced to upset the alignment of the said levers to produce appropriate actuation of the valve 4 consequent upon load reaction to the hydraulic motor tending to get out of balance with the tension setting of the spring 35, and (d) a stabilising or time-lag regulating device embodied in a housing 20.

Following the foregoing summary of certain elements of the servo-device and its associated mechanism, we shall now describe its construction in detail.

The servo-device embodies a sliding type of control valve 4 operated off a system of linkage and controlling the admission of pressure fluid to a cylinder 5 accommodating a piston 6 having a push-pull connection 8' to the actuating lever 111' of the tilting plate of the hydraulic motor, the piston rod 8 extending through both ends of the cylinder, the end remote from the motor sliding in a cylindrical chamber 9 acting as a dash-pot device and accommodating midway between its ends a needle type bleed valve 10 together with means (hereinafter described) for adjusting the reaction of the dash-pot to the movement of the piston, the arrangement being such that when the piston 6 is moved to adjust the tilt of the plate of the hydraulic motor, suction or pressure, according to the direction of movement of the piston 6, is created in the dash-pot 9, and the piston 11 of the dash-pot is moved against the influence of a leaf spring 12 further into or away from the cylinder, the dash-pot piston being connected by a link 13a to the leaf spring 12, which link is connected about midway between its ends to one end, which can be referred to as the upper end, of a relatively perpendicular lever 14, which by reason of the traction of the dashpot piston, applies through the medium of a connecting rod 15, sliding movement to the control valve. The lower end of the lever 14 turns about the upper end of a further lever 16 controlled through the medium of a rod 17 from a flexible diaphragm 18 supported at its perimeter in a pocket 19 in such manner that variations in pressure in the pocket will produce a movement of the aforesaid rod 17 and consequently adjustment of the lever 16 by reason of the pivotal connection 16' of the rod 17 to the lever 16. The lever 16 actuated off the diaphragm can, for the purpose of designation be regarded as the "diaphragm actuated" lever, the first mentioned lever which is connected to the pilot valve being suitably designated as the "dashpot actuated" lever.

The diaphragm 18 with its pocket 19 forms part of a stabilising device comprising an outer housing or block 20 within which slides a cylindrical inner block 21 having a quite restricted movement relatively to the outer block and being damped by a dash-pot 22 in one end of the outer block, the piston 23 of this dash-pot being formed on the end of a rod 24 remote from the inner block and carrying between its ends a double-piston type of valve 25 operating in a chamber 25' fed by a conduit 26 leading from the aforesaid pocket 19 and having a port 27 to exhaust, this pocket 19 also communicating with a bore 28 in the end of the aforesaid outer block remote from the end containing the dash-pot, this bore receiving a double-piston type of valve 29 connected by a rod 30 and link 30' to the upper end of a further lever 31 the fulcrum 32 of which is approximately midway between its ends, the lower end of this third lever being connected by a link 33 to an abutment member 34 of a spring 35 of a pressure measuring device, comprising the plunger 36 carried by the abutment 34 and operating within a cylinder 37 which can be cconnected by a conduit 38 to any suitable source of hydraulic fluid pressure via means which alters the pressure in the conduit 38 according to variations in the load on the output of the hydraulic motor containing the lever 111', e. g., connected to the pump discharge or pressure line 39 from the pump 110 to the motor 111. Consequently this third lever 31 can be designated as the "pressure measuring device" actuated lever.

The said bore 28 accommodating the latter mentioned double-piston type of valve 29 communicates with the inlet 4' of the cylinder 4a of the aforesaid pilot valve via a pipe line 40' leading from the discharge line 41' of a gear pump 41 driven from an electric motor 42. This motor 42 would normally be a fractional horse power motor.

An adjusting screw 58 is provided to enable the loading of the spring 35 to be varied, the screw 58 being operated via worm gear 59 driven from a tension adjustment shaft 60, and the aforesaid spring 35 is interposed between the said abutment 34 and one end of a housing 43 and connected by suitable remote control means, e. g. a cam or link and lever 44 and shaft 45, to a tension indicator 46 to indicate the pre-setting load on the spring, a variation in load on the spring, to take care of changes in load imposed on the hydraulic motor output, e. g. changes in tension of the strip material, being derived from the conduit 38 connected as aforesaid to any suitable means which will respond to such changes. The shaft 42' on the aforesaid fractional horse power electric motor 42 to the gear pump 41 has a gear connection 42a to a shaft 47 driving an eccentric 48 operating a longitudinal rod 49, the end of which remote from the eccentric is connected to the lower end of a link 50 pivoted at its upper end to a fixed pivotal point 51 thus providing a "dither" mechanism to keep the whole of the mechanism of the control apparatus "alive" and thus remove static friction. This ensures that the pilot valve 4 will accurately return to its closed position when no pressure error exists, and will thereby eliminate any tendency for the tilt control piston 6 to creep due to the pressure fluid being admitted through the pilot valve 4 to one side of the tilt control cylinder 5. This "dither" on the pilot valve also enables the control to respond to very small sustained variations in pressure in the pump and motor circuit. Alternatively this "dither" may be effected hydraulically by introducing pulsations into the chamber 9.

To enable the pilot valve 4 to be centred accurately in its valve block when the levers 31, 16 and 14 are in the neutral position, the leaf spring 12 is fixed to a short cranked extension 61' of a lever 61 operated off an adjuster screw 62.

The position of the fulcrum 32 of the third mentioned, or lower lever 31, i. e. of the lever connected to the abutment of the spring 35 of the pressure measuring device, is adjustable so that the movement of the pilot valve 4 for a given variation in pressure due to load reaction to the hydraulic motor containing lever 111' can be varied on test to ascertain the most suitable rate of response of angle of lever 111'. In this connection such fulcrum, which as aforesaid is between the ends of this lever, is in a collar 32b slidable along the lever 31 and pivoted to a bracket 32' connected by a push-pull rod 32a to a remote control adjuster 52, this adjuster thereby adjusting the position of the fulcrum 32 of the lever 31 which connects the piston 36 to the aforesaid stabilising device.

The aforesaid double piston type of valve 29 of the stabilising device has its rod 30 prolonged into the inner or sliding block of the stabilising device to carry at its end remote from the double piston type valve a further similar type of valve 53. In operation the aforesaid gear pump 41 supplies the bores 28 and 25' of the two double piston type valves 29 and 25 respectively with fluid at a constant pressure, the fluid passing through the first mentioned double piston valve bore 28 and a port 19' leading to the pocket 19 containing the diaphragm 18, from whence it passes via the conduit 26 to the bore 25' of the double piston type valve 25 which is connected to the aforesaid dash-pot 22 in one end of the outer block of the stabilising device and from whence the fluid passes via outlet 27 to exhaust.

The double piston valve 29 connected to the upper end of the lower lever 31 of the first mentioned three levers and the double piston valve 53 in the sliding block are preset so that when the said three levers 14, 16 and 31 are in the neutral position the port 19' communicating with the said pocket 19 and the outlet port 27 in the outer block of the stabilising device are of the same area and half open as shown, consequently the pressure drop through each is the same. By this means the diaphragm in the pocket is initially deflected under a pressure of half the supply pressure.

Any movement of the aforesaid double piston type of valve 29 connected to the levers 16 and 31 changes the area of the port 19' leading to the pocket and at the same time opens two ports 54 and 55 in, and communicating with, opposite ends of a chamber 56 receiving the sliding block 21, these two ports being otherwise covered by the piston elements of the double piston valve in the sliding block as shown. The opening of either one of these two ports 54, 55 to the pressure supply allows pressure fluid to act on the end of the sliding block communicating with the appropriate port, so that the block will then move in the same direction of movement as the valve until the two ports 54, 55 are closed and the outlet 27 in the outer block is the same area as the port 19' communicating with the diaphragm pocket 19. Owing to the aforesaid dash-pot 22 in one end of the outer block 20 controlling the speed of movement of the double piston valve 25 controlling the said exhaust 27, there is a time lag between the changing of the area of the port 19' communicating with the pocket 19 and the equating of the areas of this latter port 19' and the said outlet port 27. This time lag can be adjusted by means of a dash-pot adjusted comprising a screw actuated conical valve 57 establishing communication between the dash-pot 22 and the surrounding hydraulic fluid.

The foregoing describes the general arrangement of the control unit, and it will be appreciated that in operation, having regard to the fact that the variable rate spring 35 takes care of changes in tension build-up in the strip material being wound, i. e. changes in load on the means driven by the hydraulic motor carrying lever 111' by responding to such changes so as to vary the setting of the lever 111', the effective horse power output of the hydraulic motor is maintained at a predetermined value depending upon the tension required in the material and its velocity, e. g. in the feeding of strip metal from rolls to a take-up drum.

The pressure measuring device 36 is set before starting to roll the strip, by means of the tension adjustment shaft 60, so that when the tension in the strip is at the required value, the pressure in the conduit 38 balances against the said spring 35 whereby the said three levers 14, 16 and 31 are held in the inline or neutral position, the pilot valve 4 is closed, and there is no movement of the tilt control piston 6. Any variation in this tension would produce a variation in pressure in the line 38 and consequently the said three levers move from the neutral position, the pilot valve 4 opens, and the tilt control piston 6 moves to adjust the speed of the hydraulic motor.

If it is assumed that the double piston valves 29 and 53 in the said bore of the outer block 20 and in the sliding block 21 are suddenly moved in the direction of the arrow A, there is a sudden reduction of the area of the port 19' loading to the diaphragm pocket 19, whereas the adjustment of the area of the said outlet port 27 is retarded. This will cause a greater pressure drop through the port 19' than through the outlet port 27, with a consequent reduction in the pressure in the said pocket 19, and hence the diaphragm will push out the rod 17 connecting it to the intermediate lever 16. A reversal of the movement of piston valves 29 and 53 will result in this rod 17 and the lever 16 being pulled in.

This displacement of the rod 17 is proportional to the rate of change of error, since the pressure drop in the pocket is proportional to the difference in area of the pocket port 19' and outlet port 27 and the slower the movement of the double piston valve 29 the closer the double piston valve 25 connected to the sliding block 21 follows the valve 29, and the area of opening the said exhaust port 27 follows the area of opening of the port 19' connecting with the pocket 19. Variations of response of the sliding block 21 can be effected by adjustment of the valve 57.

Arising out of the foregoing, as the area of the outlet port 27 approaches the area of the diaphragm pocket port 19', the pressure drop through the exhaust port 27 approaches the pressure drop through the diaphragm pocket port 19' and consequently the displacement of the shaft 17 connected to the diaphragm is gradually reduced until the area of the outlet port 27 equals the area of the diaphragm pocket port 19' whence the diaphragm is returned to its initial position.

Now assume that there is a rise in tension in the strip above the predetermined value; this will create a rise in pressure in the conduit 38 and the resultant movement of the piston 36 in the pressure measuring device will be in a direction of the arrow B, the lever 31 turning about its fulcrum 32 and the coupled double piston valves 29, 53 of the stabilising device will move inwards. The intermediate lever 16 of the said three levers will consequently turn about the pivot 16' on the rod connected to the diaphragm, and the lower end pivot of the upper lever 14 will move out. At the same time the diaphragm rod 17 will move out owing to a reduction of pressure in the said pocket as previously indicated, the intermediate lever 16 will pivot about its lower end 16a and its movement will be increased. This latter additional movement due to the movement of the diaphragm shaft 17 is gradually removed as indicated in the preceding paragraph. The upper lever 14 of the three levers will pivot about its upper end 14a and the pilot valve 4 will open in the direction of the arrow C. Pressure fluid will then be admitted behind the tilt control piston 6 and the tilt of the hydraulic motor plate will be increased and the speed of the winding drum reduced.

When the tilt control piston 6 moves, it will create a suction in its associated dash-pot 9, and the piston 11 therein acting against the leaf-spring 12, will be drawn further into the cylinder. The upper lever 14 will pivot about its lower end and the pilot valve 4 will begin to close. The suction created in this dash-pot 9 will draw fluid through the adjustable needle valve 10 of the dash-pot, and opposing the leaf-spring 12 tends to close the valve 4 so that when the pressure in the main system is restored the rate of movement of the piston 6 has been retarded and approaches its new position simultaneously with the restoration of the pressure in the system. This action is continuous while the tilt control piston 6 is moving, and tends to restrict the rate of change of tilt or acceleration of the drum, smoothing the operation of the control and reducing any tendency for the tilt lever 111' to overshoot the required position. The amount of restriction to the rate of change of tilt to give the most stable condition is obtained by means of the dash-pot adjuster 10.

If the pressure in the conduit 38 falls, a reversal of the above sequence of events takes place, until the pressure returns to the predetermined value and the said three coupled levers are again in their neutral positions.

When it is desired to regulate the take-up of the fed material in synchronism with the processing of the material in such manner that if the feed or processing stops, the material can be fed over or through a feeler in the form of a lever, and for a photo-electric cell device or other means for measuring catenary, and the lever, or its equivalent connected through the medium of a mechanical, hydraulic or electric linkage, so that the rise and fall of the lever, or the effect of the change of catonary, i. e. the displacement of the strip material relatively to the light source of a photo-electric cell is transmitted to the lever 31 instead of to the cylinder 37 and spring 35 to obtain a control of the hydraulic drive.

In the embodiment shown in Figure 2 the lever 31 is connected at its upper end to a piston 29b so that this piston moves at a velocity proportional to the rate of change of error, resulting in oil being pressed out of or drawn in via the adjustable orifice 70 giving a pressure in the port 74 depending upon the rate of displacement of the piston 29b and adjustment of area of the orifice 70 which pressure reacts on piston 18b in cylinder 72 against the appropriate one of a pair of balanced springs 71 giving a movement to the rod 17 proportionate to this pressure. Thus the displacement of the piston 18b and lever point 16' therefore depend upon the velocity of the piston 29b. The broken-line parts Figure 3 show the effect on the lever assembly. The additive motion has a damping effect on the system.

The foregoing stabilising means is an appreciably simplified alternative to the stabilising means previously described, the unit being submerged in oil, so that when the error signal gives the piston 29b a velocity to the right in the diagram oil is sucked into the cylinder 73 and the piston 18b moved to the left. By providing an adjustable orifice 70 the ratio between the deflection of the piston 18b and the velocity of the piston 29b can be regulated.

It will be appreciated that the present invention is applicable also to the automatic control in quantity output of a pump so as to obtain a uniform pressure in lines to a number of apparatus fed by the pump, and in which the number of apparatus in use at a time is subject to variations, e. g., in a works or aircraft where one pump is common to a plurality of hydraulic fluid pressure actuated apparatus. In such an arrangement changes in the number of apparatus being fed by the pump will change the pressure in the pump discharge side unless provision is made to adjust, e. g., the stroke and consequently quantity output of the pump automatically according to the changes in reaction due to increase or decrease in number of apparatus being served. Hence, by controlling the pressure in the line 38 to the cylinder 37 via means responding to the reaction in the supply line from the pump, the necessary changes in quantity of fluid flowing per given unit of time from the pump can be effected so as to obtain constant pressure to the apparatus in use.

We claim:

1. A hydraulic appliance for obtaining a substantially constant horse power output from a hydraulic engine subjected to varying loads, comprising a wholly hydraulic fluid pressure operated ram adapted to be connected operatively to a controller on the engine, means for generating fluid pressure at a constant pressure for actuating said ram, a control valve for regulating the supply of pressure fluid to said ram, a spring balancing against the predetermined load on the engine, means for adjusting the balancing load of the spring, a system of levers connected across the spring and the control valve and, when the said load is balanced against the spring, holding the control valve in the closed position to withhold movement of the said ram, means to pre-set the levers in relationship with each other appropriate to a neutral position complementary with the balancing of the predetermined load against the said spring, a dashpot damping said ram, and a constant fluid pressure actuated phase advance mechanism to advance the valve movement at a rate dependent upon the increase and decrease in change of pressure of the machine, said levers comprising a series connection of two end levers and an intermediate lever, an end one of which lever actuates the control valve and is effectively loaded by said dashpot to receive a negative feed back from the ram so as to close the valve as the ram is brought to rest, the other end one of the said three levers being actuated directly from said spring, manually operated adjusting means to vary the position of the fulcrum of said latter end lever, the remaining or intermediate lever being connected to said phase advance mechanism to receive a corrective movement from such mechanism.

2. A hydraulic appliance for obtaining a substantially constant horse power output from a hydraulic engine subjected to varying loads, comprising a wholly hydraulic fluid pressure operated ram connected operatively to a controller on the engine, means for generating fluid pressure at a constant pressure for actuating said ram, a control valve for regulating the supply of pressure fluid to said ram, a spring balancing against the predetermined load on the engine, means for adjusting the balancing load of the spring, a system of levers connected across the spring and the control valve and, when the said load is balanced against the spring, holding the control valve in the closed position to withhold movement of the said ram, means to pre-set the levers in relationship with each other appropriate to a neutral position complementary with the balancing of the predetermined load against the said spring, a dashpot damping said ram, and a constant fluid pressure actuated phase advance mechanism to advance the valve movement at a rate dependent upon the increase and decrease in change of pressure of the machine, said levers comprising a series connection of two end levers and an intermediate lever an end one of which levers actuates the control valve and is effectively loaded by said dashpot to receive a negative feed back from the ram so as to close the valve as the ram is brought to rest, the other end one of the said three levers being actuated directly from said spring, manually operated adjusting means to vary the position of the fulcrum of said latter end lever, the intermediate lever being connected to said phase advance mechanism to receive a corrective movement from such mechanism, said constant phase advance mechanism comprising a housing having a fluid pressure inlet port fed from the constant pressure source, and an outlet port with an intermediate fluid pressure actuated member connected to said intermediate lever to apply the corrective movement thereto, a valve controlling said inlet port and actuated by the lever with the adjustable fulcrum, a valve controlling said exhaust port, a fluid pressure operated driver actuating said latter valve, a valve controlling such driver and connected to and moving in unison with the said inlet port valve, the said inlet port and outlet port valves co-operating to produce equal port opening areas when the control valve and the said levers are in the neutral position, the said valve controlled driver retarding the movement of the exhaust port area-controlling-valve relatively to the inlet port area-controlling-valve consequent upon displacement of the latter valve by the lever with the adjustable fulcrum.

3. Apparatus for controlling the displacement of a variably displaceable hydraulic machine for obtaining a substantially constant horse power output from the machine, comprising a wholly hydraulically operated actuator connected to a controller of the machine, constant fluid pressure generating means to supply fluid pressure to the said actuator, valve means for controlling the supply of hydraulic fluid pressure to the actuator, a fluid pressure displaceable member exposed to the influence of the working fluid pressure of the machine, variable motion transmitting means transmitting the displacement of said displaceable member as a signal to said valve means to vary the setting of the valve means, means to load adjustably said displaceable member to balance a predetermined working pressure of said machine and yielding to machine load above said predetermined pressure so as to apply to the valve means via said motion transmitting means an adjustment proportional to the change in the load on said machine from the predetermined setting, fluid pressure operated means imparting motion variations in the said variable motion transmitting means, servo-valve means actuated by the displacements of said displaceable member and controlling the supply of pressure fluid to said means imparting motion variations to said motion transmitting means to produce compensating movements proportional to the rate of change of load on the machine, a dashpot member slidably following the movements of said actuator and actuated by negative and positive fluid pressure generated by the movements of said actuator, and means yieldingly opposing said negative and positive fluid pressure and maintaining the dashpot in a neutral position when said valve means is closed and connected to said valve means to cause the valve means to follow up the movements of the actuator to complete the closing of the valve means when the actuator has completed its displacement of the hydraulic machine.

4. Apparatus for controlling the displacement of a variably displaceable hydraulic machine for obtaining a substantially constant horse power output from the machine, comprising a wholly hydraulically operated actuator connected to a controller of the machine, constant fluid pressure generating means to supply fluid pressure to the said actuator, valve means for controlling the supply of hydraulic fluid pressure to the actuator, a fluid pressure displaceable member exposed to the influence of the working fluid pressure of the machine, a system of levers transmitting the displacement of said displaceable member as a signal to said valve means to vary the setting of the valve means, means to load adjustably said displaceable member to balance a predetermined working pressure of said machine and yielding to machine load above said predetermined pressure so as to apply to the valve means an adjustment proportional to the change in the load on said machine from the predetermined setting, fluid pressure operated means imparting motion variations to said system of levers, servo-valve means actuated by the displacements of said displaceable member and controlling the supply of pressure fluid to said means imparting motion variations to said system of levers to produce compensating movements proportional to the rate of change of load on the machine, a dashpot including a displaceable element operated by negative and positive fluid pressure generated by said actuator, means yieldingly opposing said negative and positive fluid pressure and maintaining the dashpot in a neutral position when said valve means is closed, and means connecting said displaceable element to said system of levers so as to transmit the movements applied to said dashpot element to the said valve means to restore the valve means to the closed condition to bring said actuator to rest when the said predetermined pressure on the machine has been restored by the operation of said machine controlled by said actuator.

5. A hydraulic appliance for obtaining a substantially constant horse power output from a hydraulic engine subjected to varying loads, comprising a wholly hydraulic fluid pressure operated ram connected operatively to a controller on the engine, means for generating fluid pressure at a constant pressure for actuating said ram, a control valve for regulating the supply and direction of feed of fluid pressure to said ram, a spring to balance against the predetermined load on the engine, a fluid pressure actuated member initiating a signal to said control valve and loaded in one direction by said spring and actuated in the opposite direction against the influence of said spring by hydraulic fluid pressure generated in the engine and which varies directly with the load on the engine, means for adjusting the balancing load of the spring against said load on the engine, a dashpot with a displaceable member operated by negative and positive fluid pressure generated by said ram, means yieldingly opposing displacement of said displaceable member of the dashpot, a system of levers connected across the said signal initiating actuator and the said dashpot displaceable member and including one lever connected to and displaceably influenced by said dashpot displaceable member and also connected to said control valve to actuate the control valve, means to pre-set the levers of said system of levers in relationship with each other appropriate to a neutral position complementary with the balancing of the predetermined load against the said spring, a source of constant load fluid pressure, valve means operated off the said system of levers, and a fluid pressure actuated member connected and imparting to another lever of the said system of levers a compensating movement proportional to said rate of change of load on the engine and actuated by fluid pressure fed from said latter source via said latter valve means.

6. Apparatus for controlling the displacement of a variably displaceable hydraulic machine, comprising a fluid pressure actuated ram, a pump generating fluid pressure to actuate the ram, said ram being positively driven by the fluid pressure in opposite directions and being connected to a controller of the machine for varying the displacement of the machine, a control valve controllably connecting the said ram to said pump source for controlling the extent and direction of operation of the ram, spring means yieldingly opposing the working pressure of the machine and controlling the displacement of the ram, means to adjust the spring means to balance a predetermined working pressure of said machine, a system of levers to transmit the yield and reassertion of said spring as a signal to said control valve, and means to impose in said signal transmitting means a correction which is a function of the rate of change of said working pressure and comprising a signal correcting valve actuated by the said spring means in response to the yield and reassertion of the spring means, a fluid pressure displaceable signal correcting element actuated by pressure fluid fed from said pump via said latter valve and displaceable proportionally to the rate of change of error of the hydraulic machine and connected to said system of levers to vary the effective leverage applied to the said system of levers by the said yield and reassertion of said spring means, a fluid pressure actuated dashpot element actuated by positive and negative pressure generated by said ram and transmitting its movement via part of said system of levers to said control valve.

ARTHUR SPENCER.
JOHN HEWITT.

REFERENCES CITED

The following references are of record in the file of this patent:

UNITED STATES PATENTS

| Number | Name | Date |
| --- | --- | --- |
| 2,179,071 | Wiedmann | Nov. 7, 1939 |
| 2,413,301 | Ellis | Dec. 31, 1946 |
| 2,425,496 | Tyler | Aug. 12, 1947 |
| 2,447,442 | Tweedale et al. | Aug. 17, 1948 |